United States Patent [19]

Pandelena et al.

[11] 4,451,368

[45] May 29, 1984

[54] ANNULAR DRIP COLLECTOR AND CAP

[76] Inventors: Michael N. Pandelena, 15 Old Ferry Rd., Methuen, Mass. 01855; Peter Strozza, 322 Oak St., Methuen, Mass. 01844

[21] Appl. No.: 537,709

[22] Filed: Sep. 30, 1983

Related U.S. Application Data

[63] Continuation-in-part of Ser. No. 431,763, Sep. 30, 1982, abandoned.

[51] Int. Cl.³ ............................................. B01D 27/00
[52] U.S. Cl. ..................................... 210/238; 210/248
[58] Field of Search .............. 210/232, 238, 248, 541, 210/168, 542, 416.4; 215/12 R, 100.5; 220/85 H, 411, DIG. 5; 123/196 A, 198 R; 141/86, 88, 207; 222/108

[56] References Cited

U.S. PATENT DOCUMENTS

| 2,529,167 | 11/1950 | Lewis et al. | 210/248 |
|---|---|---|---|
| 4,013,105 | 3/1977 | Uuskallio | 141/86 |
| 4,372,453 | 2/1983 | Branscum | 215/100.5 |
| 4,376,703 | 3/1983 | Krauss | 210/238 |

Primary Examiner—Charles N. Hart
Assistant Examiner—Wanda L. Millard
Attorney, Agent, or Firm—Pearson & Pearson

[57] ABSTRACT

An annular drip collector is shaped and dimensioned to slidably sleeve onto the cylindrical wall of an oil filled filter cartridge, in need of replacement, while the cartridge is projecting from an engine and attached by its threaded open end. The large diameter wall of the collector forms a truncated conical trough with the adjacent cylindrical portion of the cartridge wall proximate its open end to collect oil spillage. The integral, smaller diameter cylindrical wall, or skirt, of the collector toward the closed end of the cartridge is substantially equal in inside diameter to the outside diameter of the cartridge. At least one integral, inward projecting, annular rib, tooth or flange in the lower cylindrical wall, seals the collector against the cartridge by reason of the flexible, resilient, polyethylene plastic of the collector. The outwardly flared, truncated conical, collector will nest with other collectors for shipment. An annular cap snap fits over the large diameter opening of the collector to retain oil spillage when the cartridge is horizontal, the caps also nesting for shipment.

11 Claims, 9 Drawing Figures

ANNULAR DRIP COLLECTOR AND CAP

RELATED APPLICATION

This application is a continuation-in-part of our application, Ser. No. 431,763 filed Sept. 30, 1982, now abandoned.

BACKGROUND OF THE INVENTION

It has, heretofore, been proposed to provide an annular, upward-opening, dished receptacle around an object, especially to collect overflow drippings spilling down the sides of the object.

In U.S. Pat. No. 2,920,804 to Minton of Jan. 12, 1960 the annular receptacle is a tray snap fitted around a tapered, glass holding, jacket and intended to hold food in the tray and a beverage glass in the jacket.

In U.S. Pat. No. 2,948,452 to Grogan, et al, of Aug. 9, 1960 a similar device is disclosed in which a tapered jacket holds an ice cream cone and an annular tray collects any drip.

The same general structure is disclosed in U.S. Pat. No. 3,027,037 to Bronson of Mar. 27, 1962 wherein the annular tray fits around the neck of a bottle for holding candies, nuts, or the like.

A device intended to solve the problem of oil drippage when an oil filter cartridge is removed from an engine, for replacement is disclosed in U.S. Pat. No. 4,020,922 to Klasei of May 3, 1977. In this patent, the truncated conical filter catcher has a transparent plastic bag attached to the lower portion so that the cartridge will fall into the bag when unscrewed from the engine.

In certain foreign automobiles the oil filter cartridge may have its open end threadly attached to the motor block so that its closed end extends horizontally or at an angle from the block, rather than depending downwardly therefrom as shown in some of the above patents.

U.S. Pat. No. 4,376,703 to Krauss of Mar. 15, 1983 proposes to solve this problem with an oil filter cover which is generally cylindrical in configuration, the portion at the open threaded end of the cartridge being formed as a bellows, to seal against spillage. FIG. 5 of this patent discloses an alternative in which the cover is cylindrical at the open threaded end of the cartridge, then flares outwardly as a bellows and then flares further outwardly in truncated conical form to create a lower reservoir, at an inturned lower portion near the closed end of the cartridge. An O-ring is used to seal the cover against the cartridge.

None of the above devices can be used for retaining spillage either horizontally or vertically, while still being within cost reach of the user because they cannot be easily injection molded, they cannot be nested for shipment and O ring seals, which run to several dollars each, making the device unduly expensive and unlikely to be considered disposable.

SUMMARY OF THE INVENTION

In this invention, an annular oil drip collector of flexible, resilient, disposable plastic is provided which can be sleeved along and around the cylindrical outer wall of a projecting filter cartridge to about mid-height of the cartridge. The large diameter wall of the collector forms an annular, deep, trough with the adjacent portion of the cartridge wall, and the integral smaller diameter wall of the collector is cylindrical with an inside surface having a diameter substantially equal to the outside diameter of the cylindrical wall of the cartridge.

The inside surface of the small diameter wall not only fits tightly around the cartridge wall, but it is provided with at least one integral inward projecting annular, rib, sharp pointed tooth, or terminal flange arranged to resiliently and frictionally contact the cartridge wall and seal the trough against leakage.

The outside surface of the upper large diameter wall of the collector is provided with spaced, axially extending ribs which fit in corresponding grooves in the next lower collector in a stack when a plurality of the disposal collectors of frustro conical shape are nested in a compact stack.

Thus, the funnel shaped body of the collector of this invention has a cylindrical, lower closure wall, with a central opening substantially equal in inside diameter to the outer diameter of the cartridge, but with integral inward projections for sealing against oil leakage. It has a truncated conical side wall flaring outwardly from the reduced diameter, lower, cylindrical, closure wall, to an upper, open, circular end of enlarged diameter, substantially greater than the outside diameter of the cartridge. An oil spillage collection reservoir is preferably formed in the collector by an annular cap snap fitted over the enlarged open end by an integral skirt and having an inturned flange with a central opening, substantially equal in diameter to the outside diameter of the cartridge, and forming an oil spillage reservoir of annular configuration proximate the inner, or threadedly attached, end of the cartridge. The caps and the funnel shaped bodies of the collectors can each be nested for shipment or storage and the collector will retain spilled oil, whether vertical inclined, or horizontal, in its reservoir.

DESCRIPTION OF A PREFERRED EMBODIMENT

Figure 1:
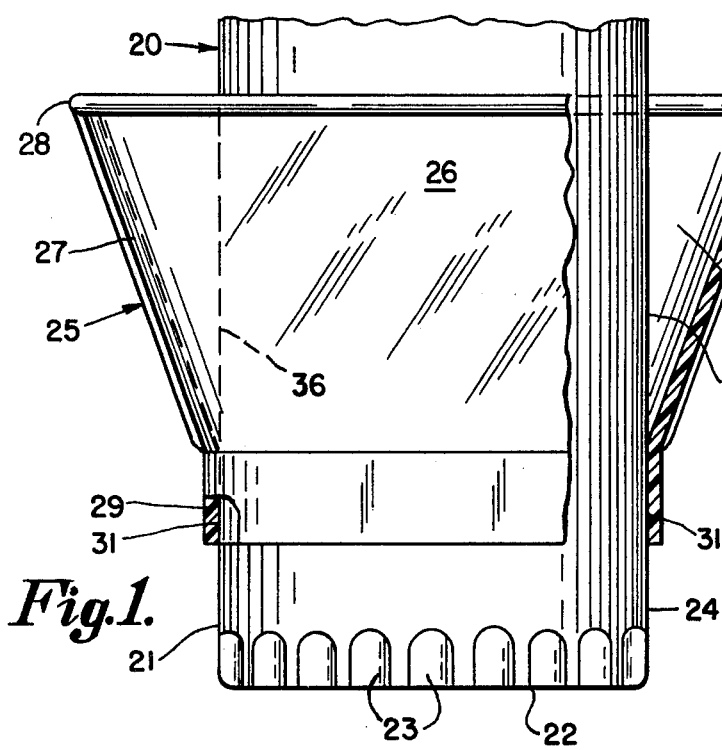
FIG. 1 is a fragmentary side elevation of an oil filter cartridge with the main body of the oil drip collector of the invention sleeved therearound midway of the height, parts being broken away for clarity.
Figure 2:
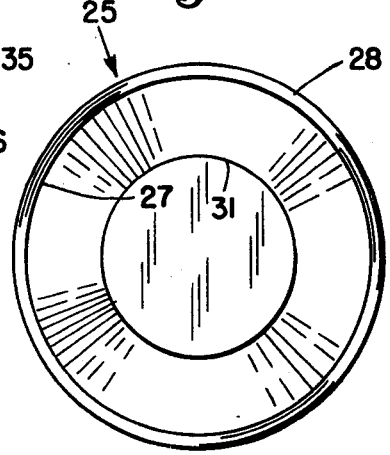
FIG. 2 is a top plan view of the main body of the collector of FIG. 1 on a reduced scale.

As shown in the drawing, a typical oil filter cartridge 20, depends from a threaded connection under the typical engine (not shown) and includes a cylindrical wall 21, closed end flat bottom 22, and spaced finger grip recesses 23 so that it may be turned for removal, and replacement. It is well known that when a garage mechanic attempts such removal, the oil from the filter and from the engine tends to overflow and drip down the side wall surface 24 to cover the hand, arm and sleeve of the mechanic with oil spillage.

The cylindrical wall 21 of filter cartridge 20, is of predetermined, substantially uniform diameter, so that the funnel-shaped main body 30 of annular drip collector 25 of the invention may be slidably sleeved thereon to about mid-way of the height of the cartridge.

The collector 25 is preferably formed of flexible, resilient, disposable plastic, such as polyethylene 26 and preferably includes an upper, frustro-conical wall 27 having an upper rim 28, and of substantially greater average diameter than the diameter of the wall 21, of cartridge 20. It also includes an integral, outer, cylindrical closure wall, or skirt 29, having an inside surface 31, which is substantially equal in diameter to the outside diameter of cylindrical wall 21, of cartridge 20.

Figure 4:
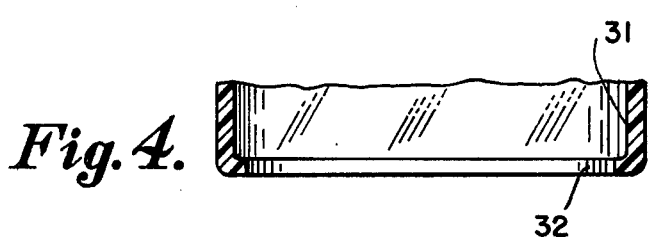
FIGS. 4, 5, and 6 are fragmentary side elevations showing different embodiments of the sealing ribs, teeth, or flanges on the cylindrical, lower, closure wall of the collector.
Figure 5:
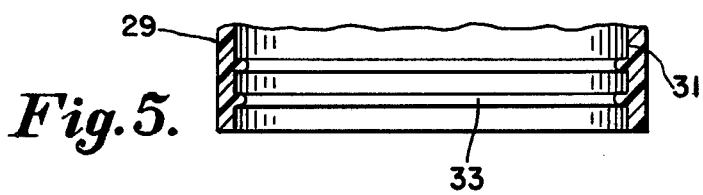
Figure 6:
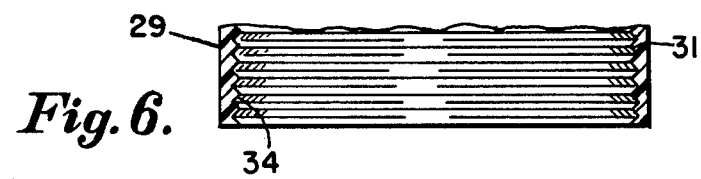

The inner surface 31, resiliently and frictionally contacts the outer surface 24, of the wall 21, of cartridge 20, to seal the same against oil leakage. Preferably, however, at least one annular, inwardly directed, terminal flange 32 (FIG. 4), or annular, inwardly directed rib 33 (FIG. 5), or annular inward directed sharp pointed tooth, or serration 34 (FIG. 6) is provided on inside surface 31 to resiliently and frictionally contact surface 24, of wall 21, and seal the same against oil leakage.

It will be seen that unlike the annular receptacles of U or V shaped cross section of the prior art, wherein there is an inner, upstanding wall to create a trough, in this invention the frustro-conical wall 27 forms an annular trough 35 with the adjacent portion 36, of the wall 21, of cartridge 20. Thus, considerable plastic material is saved, enabling the device to be discarded without undue waste or expense.

Figure 3:
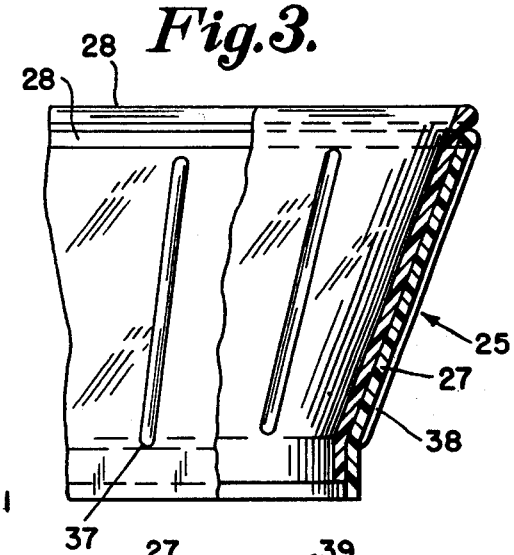
FIG. 3 is a fragmentary view similar to FIG. 1, showing the ribs on a plurality of the nested main bodies of the collectors in a stack.
Figure 7:
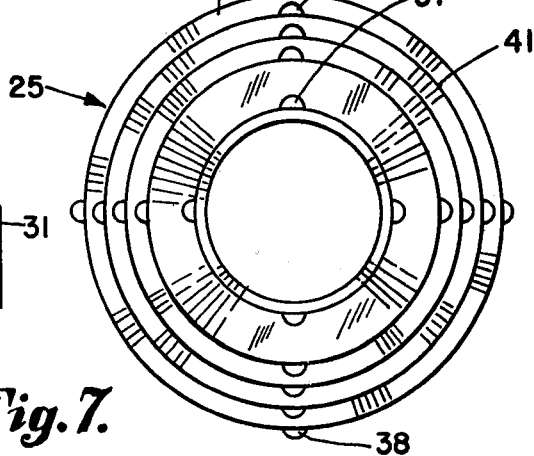
FIG. 7 is a top plan view of the stack of truncated conical main bodies of the collectors nested for shipment or storage.

As best shown in FIGS. 3 and 7, the frustro-conical wall 27, preferably includes a plurality of axially extending ribs, such as 37 and 38, spaced therearound and a plurality of corresponding, rib-receiving, grooves 39 on the the inside surface 41 of the wall 27. As shown, a plurality of the ribbed collectors 25 may be nested in a compact stack with the ribs 37 or 38, of each collector 25, received in the rib grooves 39 of the next lowermost collector in the stack.

Figure 8:
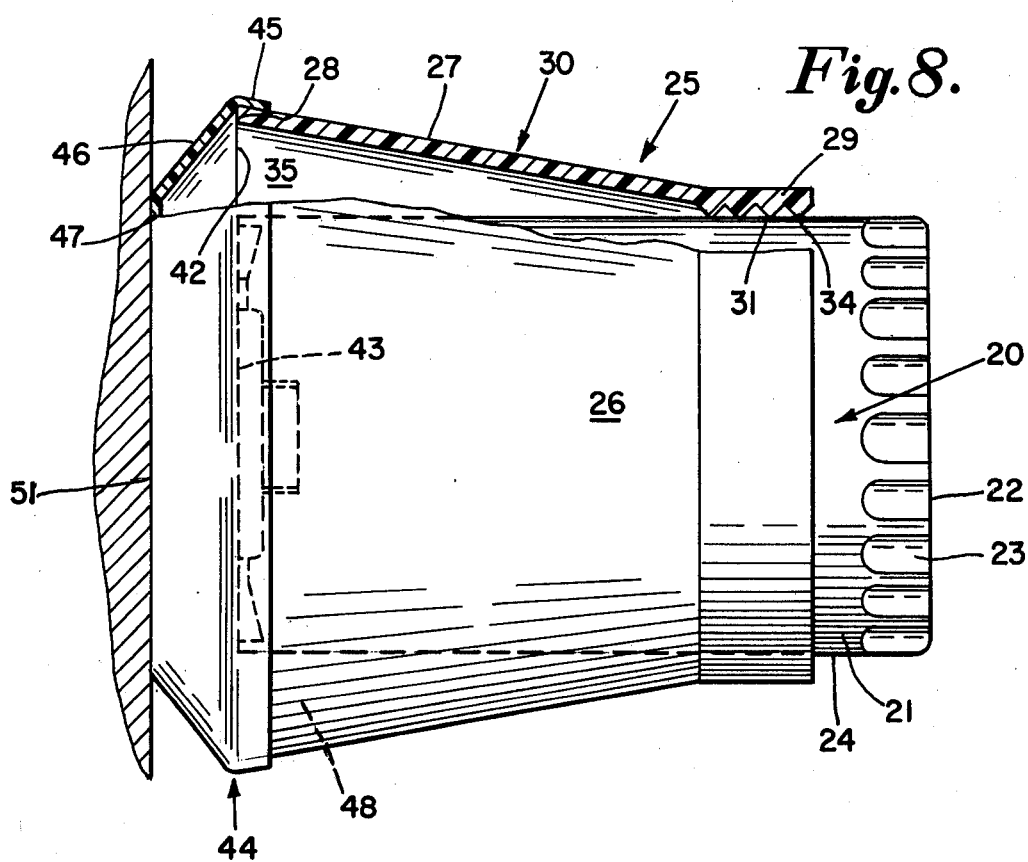
FIG. 8 is a view similar to FIG. 1 of the preferred embodiment of the invention.

As shown in FIG. 8, frustro-conical side wall 27, of funnel-shaped main body 30, flares outwardly from the cylindrical outer closure wall 29, at an increasingly spaced distance from the cylindrical side wall 21 of cartridge 20, to terminate in the circular rim 28 which has a circular opening 42, of enlarged diameter, substantially greater than the diameter of cartridge wall 21, and which is located beyond the threaded end wall 43, of cartridge 20.

The collector 25 also preferably includes an annular cap 44, having a peripheral skirt 45 snap-fitted over, and around, the rim 28, of main body 30. Cap 44 has an integral inturned annular flange 46, with a central circular opening 47, of reduced diameter, substantially equal to the diameter of the side wall 21 of the cartridge 20.

Figure 9:
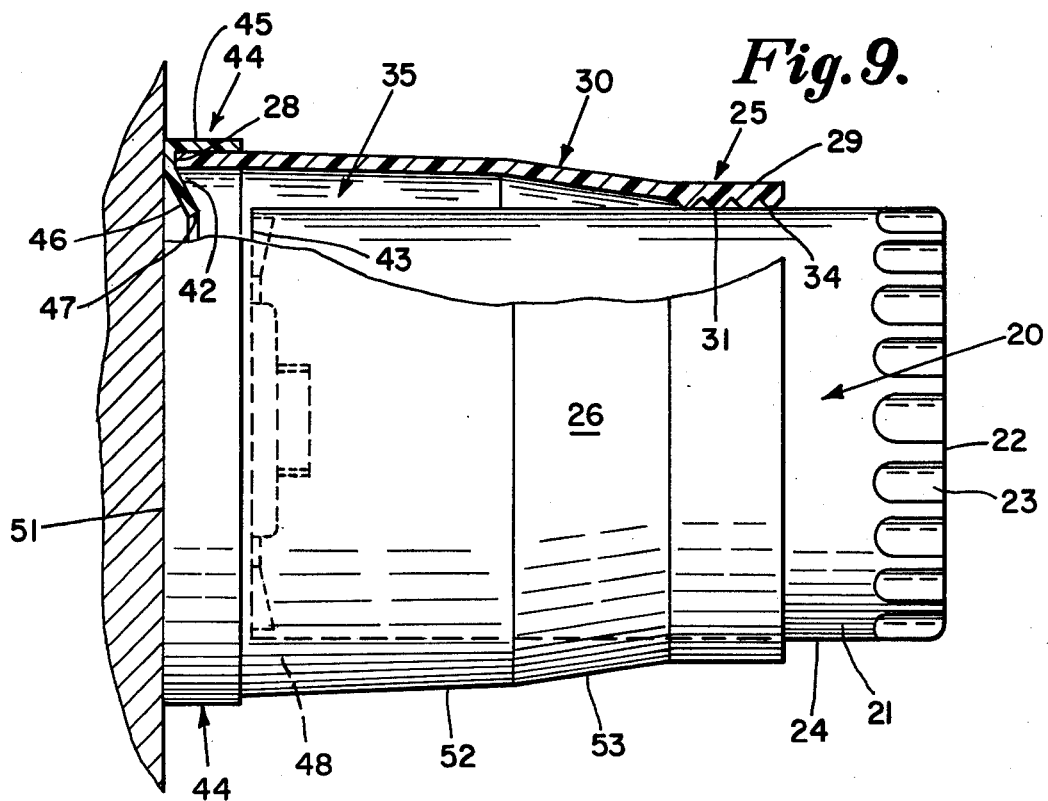
FIG. 9 is a view similar to FIG. 8 of still another embodiment of the invention.

It will be seen that when the cartridge 20 is horizontally mounted on an engine block, as shown in FIGS. 8 and 9, the cap 44, and outwardly flared wall 27, of main body 30, form an oil spillage trough, or reservoir 35, with its deep portion 48 proximate the threaded end 43 of the cartridge. The plastic material of cap 44, especially flange 46, is relatively limp, thin, resilient, and flexible, such as 0.010 inches in thickness to conform to any irregularities in the surface of the engine block and maintain a spring bias seal thereagainst as the cartridge 20, and collector 25, with its cap 44, are turned for unthreading and removal. The cap 44 also prevents overflow when the cartridge is mounted at a downward incline relative to the block, as in some foreign automobiles. Cap 44 may remain in place when vertical cartridges are to be removed, and both the main bodies 30, and the caps 44, are so tapered as to each be nestable in respective stacks for shipment, storage, and use, as required on a particular cartridge mounting.

It is preferred that the flange 46 be truncated conical as shown in FIG. 8, so that the caps 44 will not only nest more compactly in a stack, but the resiliency of the plastic will permit it to yield rearwardly and press tightly against the block 51.

In FIG. 9, the flange 46 of cap 44, is truncated conical, but turned inwardly, and the funnel shaped main body 30 has an outwardly flared wall 27, which has a sharply angled, outer frustro-conical section 53, and a less sharply angled inner frustro-conical section 52, the latter increasing the capacity of the oil spillage trough, or reservoir 35, while still permitting nesting for shipment of storage.

All oil collected in the oil spillage trough 35 may be poured out from the trough into a suitable container at the same time that the oil in the cartridge is being poured out, by removing cap 44. A set of the collectors 25, each main body of a diameter which slidably fits the diameter of filter cartridges of various manufacturers, is provided, and each having a snap fit cap 44 of appropriate dimensions.

The plastic 26, of the main body 30, of collector 25, is relatively thick such as 0.035 inches and is preferably translucent. While flexible and resilient, it is relatively stiff as compared to the material of the cap 44, which is relatively limp.

We claim:

1. In combination with an oil filter cartridge of the type having a cylindrical side wall of generally uniform diameter, a closed end and an opposite, threaded end, for screw-on attachment to a motor block:

a disposable oil drip collector comprising;

a funnel shaped main body having a cylindrical outer closure wall with a central opening substantially equal in diameter to the diameter of said cartridge side wall and sleeved thereon intermediate of the height thereof;

a generally frustro-conical side wall, flaring outwardly from said outer closure wall, at an increasingly spaced distance from said cartridge side wall, and terminating in a rim, having a circular opening of enlarged diameter, substantially greater than the diameter of said cartridge side wall and located beyond the threaded end of said cartridge;

and an annular cap, having a peripheral skirt snap fitted over, and around, said circular rim of said main body, and including an integral, inturned, annular flange with a central circular opening of a diameter substantially equal to the diameter of said cartridge side wall;

said cap and said main body forming an oil spillage reservoir, located adjacent portion of the outside wall of said cartridge and said cap and flange sealing said rim against said motor block to reduce spillage.

2. A combination as specified in claim 1 wherein:
said main body is formed of relatively thick, stiff, translucent plastic and said cap is formed of relatively limp, thin, resilient, flexible plastic.

3. A combination as specified in claim 1 wherein:
said cylindrical outer closure wall includes a plurality of integral annular ribs and grooves for resiliently, and frictionally, sealing the same against the outside wall of said cartridge to prevent leakage.

4. A combination as specified in claim 1 wherein:
said cylindrical outer closure wall includes a plurality of integral, annular, sharp pointed teetch, or serrations, for resiliently and frictionally sealing the same against the outside wall of said cartridge to prevent leakage.

5. A combination as specified in claim 1 wherein:
said cylindrical outer closure wall includes an inwardly directed, integral terminal lower annular flange for resiliently and frictionally sealing the same against the outside wall of said cartridge to prevent leakage.

6. A combination as specified in claim 1 wherein:
the frusto-conical wall of the main body of said collector includes an outer face with a plurality of axially extending, outward projecting integral ribs, at spaced distances therearound, and an inner face having a corresponding rib groove for each said rib of said frusto-conical wall;
whereby a plurality of said annular drip collectors may be nested with each other in a compact stack.

7. An annular drip collector for slidable sleeving around a screw-on type oil filter cartridge having a cylindrical outside wall of uniform predetermined diameter:
said collector having a funnel-like body of flexible resilient plastic material and with an upper, frusto-conical wall of greater diameter than the diameter of said cartridge, terminating in a circular rim of enlarged diameter, substantially greater than the diameter of the outside wall of said cartridge, and an integral lower cylindrical wall with an inside surface substantially equal in diameter to the outside diameter of said cartridge;
and a cap of flexible, resilient, plastic material snap fitted over said rim and having an inturned, annular flange, with a central opening equal in diameter to the diameter of said cartridge side wall;
said upper, frusto-conical wall of said collector, and said cap and flange, forming an annular, oil drip, collecting trough with the adjacent portion of the outside wall of said cartridge.

8. A collector as specified in claim 6 wherein:
said inside surface of said lower cylindrical closure wall includes at least one annular flange, rib, or serration projecting inwardly from said surface to frictionally and resiliently contact the outside wall of said cartridge and seal the same against leakage.

9. In combination:
an oil filter cartridge having a cylindrical wall of predetermined, substantially uniform diameter, and an inner end removably attached to an engine block so that said cartridge projects therefrom;
an annular oil drip collector, formed of flexible resilient plastic slidably sleeved on said cartridge midway of said cylindrical wall;
said collector having an integral cylindrical wall, or skirt, with an inside surface substantially equal in diameter to the outside diameter of said cartridge wall, at the outer end thereof;
said collector having an annular, trough-forming portion, integral with said cylindrical wall, or skirt, but of substantially greater diameter, terminating in a circular rim defining a circular opening of substantially greater diameter than the diameter of said cartridge;
and an annular cap removably mounted on said rim and extending around said circular opening;
said cap defining a central circular opening of reduced diameter.

10. A combination as specified in claim 8 wherein:
said cap includes a relatively wide, integral annular, flange for sealing the same againt an engine block when said cartridge is affixed to said block horizontally.

11. A combination as specified in claim 8 wherein:
said trough forming portion of said collector is of generally frusto-conical configuration.

* * * * *